United States Patent
Aoki

(10) Patent No.: US 9,148,657 B2
(45) Date of Patent: Sep. 29, 2015

(54) CALIBRATION DEVICE, RANGE-FINDING SYSTEM INCLUDING THE CALIBRATION DEVICE AND STEREO CAMERA, AND VEHICLE MOUNTING THE RANGE-FINDING SYSTEM

(71) Applicant: Shin Aoki, Kanagawa (JP)

(72) Inventor: Shin Aoki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 274 days.

(21) Appl. No.: 13/798,425

(22) Filed: Mar. 13, 2013

(65) Prior Publication Data
US 2013/0250068 A1 Sep. 26, 2013

(30) Foreign Application Priority Data

Mar. 21, 2012 (JP) .................................. 2012-063639
Jan. 10, 2013 (JP) .................................. 2013-002679

(51) Int. Cl.
*H04N 17/00* (2006.01)
*G06T 7/00* (2006.01)

(52) U.S. Cl.
CPC .............. *H04N 17/002* (2013.01); *G06T 7/002* (2013.01); *G06T 2207/10021* (2013.01); *G06T 2207/30261* (2013.01)

(58) Field of Classification Search
CPC ................... H04N 17/002; G06T 2207/30261; G06T 2207/10021; G06T 7/002
See application file for complete search history.

(56) References Cited

U.S. PATENT DOCUMENTS

| 5,530,420 | A | 6/1996 | Tsuchiya et al. |
| 2001/0002936 | A1 | 6/2001 | Tsuji et al. |
| 2006/0078197 | A1* | 4/2006 | Mitsumoto et al. ........... 382/154 |
| 2009/0012433 | A1* | 1/2009 | Fernstrom et al. ............ 600/593 |
| 2009/0046924 | A1* | 2/2009 | Morimitsu .................... 382/154 |
| 2010/0060735 | A1* | 3/2010 | Sato .............................. 348/148 |
| 2011/0081042 | A1* | 4/2011 | Kim et al. ..................... 382/100 |
| 2011/0110583 | A1 | 5/2011 | Zhang et al. |
| 2012/0224069 | A1* | 9/2012 | Aoki ............................. 348/187 |
| 2012/0236125 | A1 | 9/2012 | Umezawa et al. |

FOREIGN PATENT DOCUMENTS

| CN | 102077246 A | 5/2011 |
| EP | 1087626 A2 | 3/2001 |
| JP | 10-341458 | 12/1998 |

(Continued)

OTHER PUBLICATIONS

Chinese Office Action dated Jan. 26, 2015 for corresponding Chinese Application No. 201310085503.9.

*Primary Examiner* — Richard Torrente
*Assistant Examiner* — Joseph Suh
(74) *Attorney, Agent, or Firm* — Harness, Dickey & Pierce, P.L.C.

(57) ABSTRACT

A calibration device for calibrating ranges obtained by a range-finding system includes an image acquisition unit to receive inputs of two reference images captured by a reference imaging device at two locations and multiple items of parallax data from the parallax calculator. The calibration device includes a feature point search unit to search for multiple reference-feature points common to the two reference images, and a coordinate converter to convert coordinates of the two items of parallax data based on the multiple feature points and the multiple corresponding points. The calibration device includes a correction value calculator to calculate a correction value to correct the range measured by the range finding system, based on a converted parallax from the coordinate converter.

4 Claims, 6 Drawing Sheets

(56) References Cited

FOREIGN PATENT DOCUMENTS

| JP | 2001-169310 | | 6/2001 |
| JP | 2003-329439 | A | 11/2003 |
| JP | 2009-014445 | A | 1/2009 |
| JP | 2009-182879 | | 8/2009 |
| JP | 2010-044009 | A | 2/2010 |
| JP | 2012-058188 | | 3/2012 |

* cited by examiner

FIG. 7 COMPARATIVE EXAMPLE
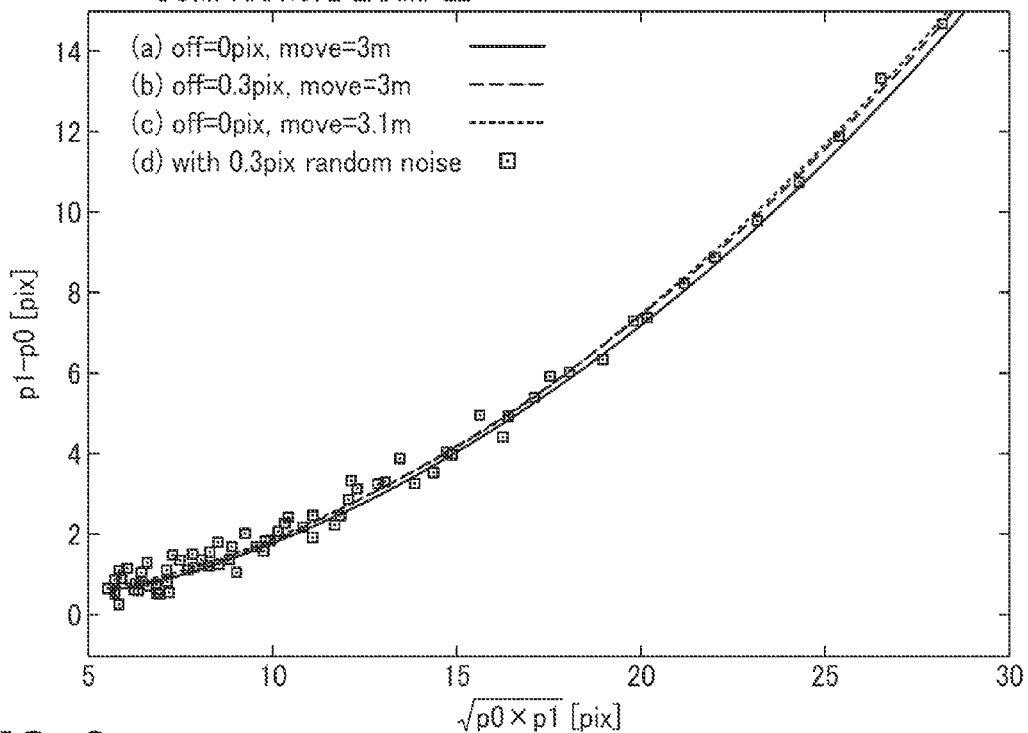
FIG. 8
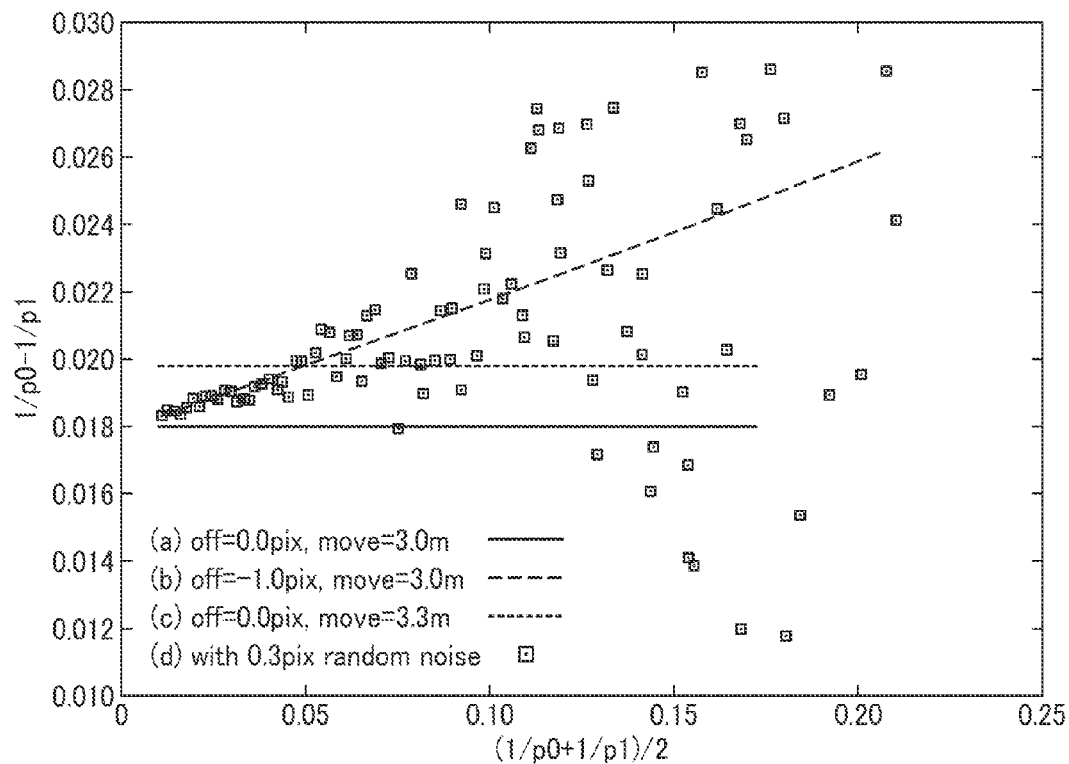

CALIBRATION DEVICE, RANGE-FINDING SYSTEM INCLUDING THE CALIBRATION DEVICE AND STEREO CAMERA, AND VEHICLE MOUNTING THE RANGE-FINDING SYSTEM

CROSS-REFERENCE TO RELATED APPLICATIONS

This patent application is based on and claims priority pursuant to 35 U.S.C. §119 to Japanese Patent Application Nos. 2012-063639, filed on Mar. 21, 2012 and 2013-002679, filed on Jan. 10, 2013 in the Japan Patent Office, the entire disclosures of which are hereby incorporated by reference herein.

BACKGROUND

1. Technical Field

The present invention relates to a calibration device capable of calibrating a stereo camera-type range-finding system, a range-finding system including a stereo camera and the calibration device, and a vehicle mounting the range-finding system.

2. Related Art

Collision avoidance systems involving the use of in-vehicle stereo cameras have become more common. A stereoscopic image of the area in front of the vehicle is generated using the stereo cameras, and an obstacle is detected and a distance to the obstacle is measured based on the generated stereoscopic image. The driver can then be alerted to take corrective action to avoid a collision or maintain a safe minimum distance between vehicles. Alternatively, the system can engage a control device such as the brakes and the steering.

The parallax offset may be calculated by memorizing the shape of motionless objects in advance, recognizing a target motionless object by matching a detected target to the memorized shape, calculating a travel distance based on a speed sensor in the vehicle, and correlating the motionless object and the distance change. The parallax offset is then calculated based on the stereo images captured at two different points.

In this example, it is necessary to store the shape of the motionless object (e.g., a green light) in memory to recognize the motionless object from a single luminance image. It is to be noted that, if the memorized object is not present, the control system does not operate. Thus, for example, the system cannot operate on the highway because there are no traffic lights on the highway. Moreover, the shapes and sizes of motionless objects such as traffic signs differ by region and nation, and it is possible that they will be changed in the future. Accordingly, the identification of motionless objects using registered shapes may not be reliable.

Alternatively, feature points may be abstracted from a pattern of shades (shading pattern) on the road ahead of the vehicle, the distance (range) measured using the feature points, road parameters indicating the position and direction of the road calculated, and the parallax offset calculated based on change in the road parameters. As long as the vehicle is moving, a flat road immediately front of the vehicle is likely to be present, and the problem that the target cannot be found is less likely to occur. In this example, recognizing an object of a specific shape is not necessary.

However, in this technique, the information source used to calculate the parallax offset is limited to the road. Consequently, motionless objects other than the road, such as walls, buildings, telephone poles, etc., cannot be leveraged effectively. This limitation becomes a serious problem in use environments other than in vehicles, such as indoors.

In addition, although depending on the camera resolution and correlation point search method, since shading on the road tends to be fine and present few long-range feature points, the above-described technique can only be used to calculate the parallax for close-range areas and cannot be used for calibration. Depending on the purpose, such as automatic adjustment of the distance between vehicles, it is sometimes desirable to set the range-finding range for a vehicle ahead at a farther distance, which may adversely affect the accuracy of the calibration.

SUMMARY

In one aspect of this disclosure, there is a calibration device for calibrating ranges obtained by a range-finding system connected to a reference imaging device to capture at least two reference images, a comparison imaging device to capture at least two comparison images, and a parallax calculator. The calibration device includes an image acquisition unit, a feature point search unit, a coordinate converter, and a correction value calculator. The image acquisition unit receives inputs of the two reference images captured by the reference imaging device at two locations and multiple items of parallax data from the parallax calculator. The parallax data is calculated based on multiple feature points in the reference images and multiple corresponding points in the comparison images correlated to the feature points in the reference images, using the two reference images and the two comparison images captured by the comparison imaging device at the two locations. The feature point search unit searches for multiple reference-feature points common to the two reference images. The coordinate converter converts coordinates of the two items of parallax data based on the multiple feature points and the multiple corresponding points, for each of the reference-feature points between the reference images. The correction value calculator calculates a correction value to correct the range measured by the range finding system, based on a converted parallax from the coordinate converter.

In another aspect of this disclosure, there is provided a novel a range-finding system including a reference imaging device to capture a reference image; a comparison imaging device to capture a comparison image; a parallax calculator to calculate parallax of the distance; and the above-described calibration device for calibrating the range measured by the range-finding system.

In yet another aspect of this disclosure, there is provided a novel a vehicle including the above-described range-finding system.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 7 is a diagram in which a parameter is plotted to a graph whose horizontal axis is a representative parallax and vertical axis is a difference of the parallax according to a comparative example;

FIG. 8 is a diagram in which a parameter is plotted to a graph whose horizontal axis is an average of parallax inverse and vertical axis is a difference of the parallax inverse according to a first embodiment;

DETAILED DESCRIPTION

Figure 1:
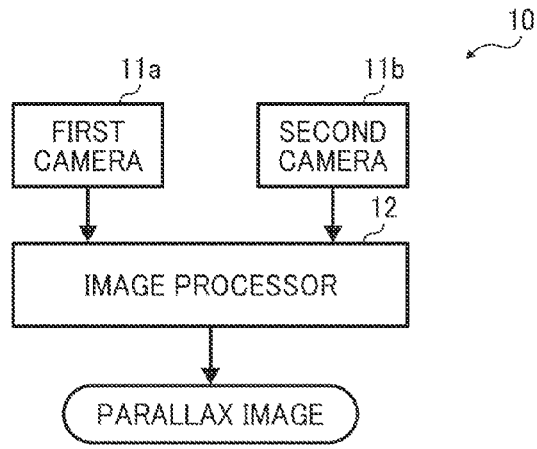
FIG. 1 is a hardware block diagram illustrating a range-finding system including a stereo camera and a calibration device according to the present disclosure.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Referring now to the drawings, wherein like reference numerals designate identical or corresponding parts throughout the several views thereof, and particularly to FIGS. 1 through 6 and 8 through 12, a range-finding system according to illustrative embodiments of the present disclosure is described.

First Embodiment

Initially, a configuration of a range-finding system 10 including a calibration device 15 of a first embodiment is described below. FIG. 1 is a hardware block diagram illustrating the range-finding system 10 including a calibration device 15 of the first embodiment. In the range-finding system 10 shown in FIG. 1, a first camera (reference camera) 11a and a second camera (comparison camera) 11b are arranged in parallel to capture image. The image processor 12 receives the captured images from the two cameras 11a and 11b and outputs the parallax image data. The image processor 12 is a general electronic computer constituted by a central processing unit (CPU), a dynamic random access memory (DRAM), a non-volatile flash memory. The range-finding function is memorized in the flash memory, which is implemented as a software program to be executed by the CPU and the DRAM.

Figure 2:
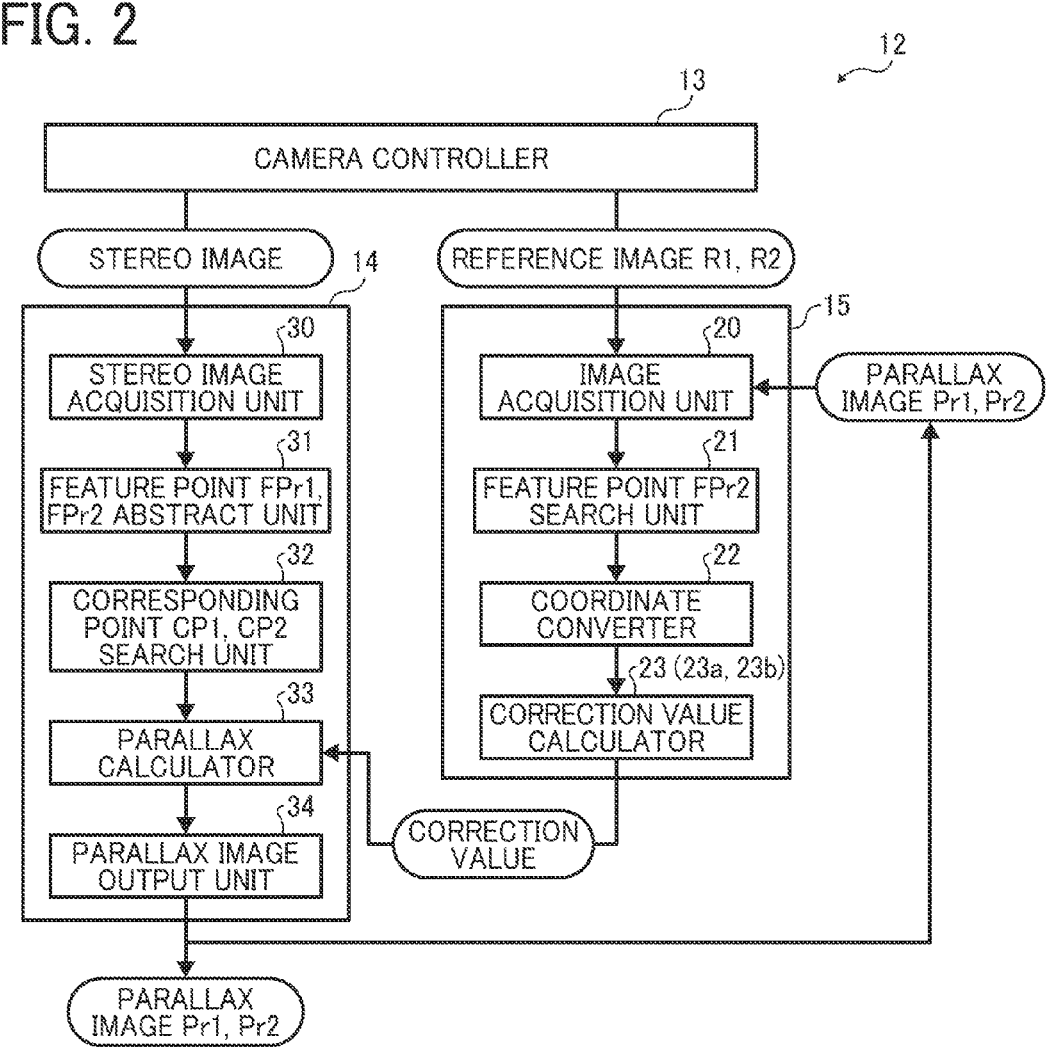
FIG. 2 is a software block diagram illustrating a configuration of an image processor in the range-finding system shown in FIG. 1.
Figure 3:
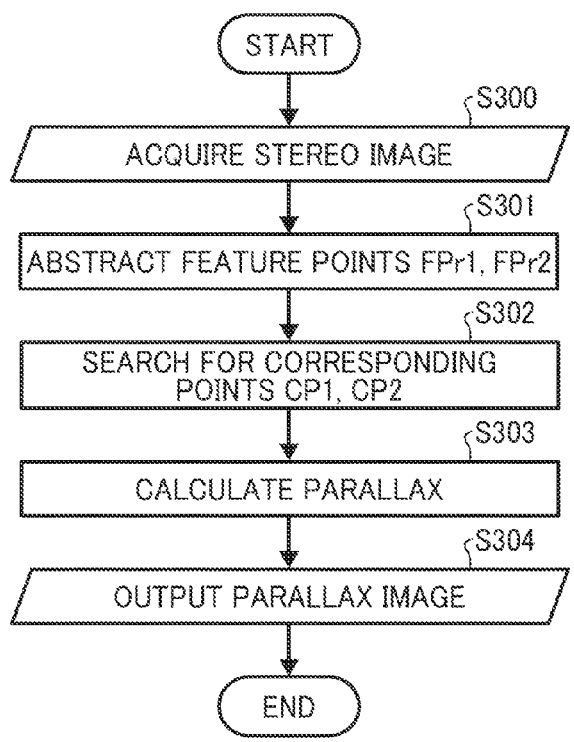
FIG. 3 is a flow chart illustrating a process executed by a parallax image generator processor in the image processor shown in FIG. 2.

FIG. 2 is a block diagram illustrating the software module executed by the image processor 12. The image processor 12 includes a camera controller 13, a parallax image generation processor 14, and a parallax offset detection processor (calibration device) 15. The camera controller 13 controls the two cameras 11a and 11b and receives the image data. In addition, the camera controller 13 executes two-cameras synchronizing, camera initializing, and exposure controlling for outputting a stereo image and an image.

Furthermore, it is desirable that, immediately after the image data is input, the camera controller 13 correct the image (other than correcting the parallax offset) using processes that are generally considered effective for stereoscopic range-finding, such as correction of optical distortion, correction of image rotation, etc., if needed. The parallax image generation processor 14 generates parallax images Pr1 and Pr2 from the stereo image input from the camera controller 13, which plays a major role as the range-finding function. The parallax image generation processor 14 receives two comparison images C1 and C2 captured by a comparison imaging device (second camera 11b) at multiple points (e.g., two points) where reference images R1 and R2 are captured by a reference imaging device (first camera) 11a. Then, the parallax image generation processor 14 calculates multiple items of the parallax data from positions of feature points (FPr1 and FPr2) and corresponding points CP1(CP2) common to the reference image R1(R2) and the comparison images C1(C2) in the stereo image.

More specifically, as illustrated in FIG. 2, the parallax image generation processor 14 includes a stereo image acquisition unit 30 that acquires the stereo image, a feature point abstract unit 31 that abstracts the feature points FPr1 and FPr2 in the respective stereo images, a corresponding point search unit 32 that searches for the corresponding feature points (corresponding point) CP1(CP2) in the comparison image C1(C2) correlated to the feature points FPr1(FPr2) in the reference image R1(R2), between the reference image R1(R2) and the comparison image C1(C2), a parallax calculator 33 that calculates the parallax from the difference of the positions of the corresponding points (CP1−FPr1; CP2−FPr2), and a parallax image output unit 34 that outputs the parallax images Pr1 and Pr2 based on the calculated parallax. The parallax offset detection processor 15 calculates the parallax offset using the reference images R1 and R2 input from the camera controller 13 and the parallax images Pr1 and Pr2 input from the parallax image generation processor 14. The calculated parallax offset is transmitted to the parallax image generation processor 14 and is used for the subsequent parallax image generation processing.

With reference to FIG. 2, the parallax offset detection processor 15 includes processing units of an image acquisition unit 20, a feature point search unit 21, a coordinate converter 22, and a correction value calculator 23. In these processing parts, the image acquisition unit 20 acquires multiple reference images (e.g., two reference images) R1 and R2 captured by the reference imaging devices (first camera) 11a at multiple points (e.g., two points) P1 and P2, from the camera controller 13. In addition, the image acquisition unit 20 receives the multiple items of parallax data, corresponding to the feature points FPr1 and FPr2 in the reference images R1 and R2 generated by the parallax image generation processor 14. In addition, the feature point search unit 21 searches for multiple reference-feature points (counterpart feature points) FPr2−FPr1 and FPr2'−FPr1' common to the reference images R1 and R2 in the image acquisition unit 20 input from the camera controller 13. The coordinate converter 22 converts the coordinates of the two items of parallax data for the reference-feature points FPr2−FPr1 and FPr2'−FPr1' common to the reference images R1 and R2 searched by the feature point search unit 21. Furthermore, the correction value calculator 23 calculates a correction value (parallax offset) of a parameter related to the positions of the imaging devices (first camera 11a, second camera 11b), from the parallax data whose coordinates are converted by the coordinate converter 22 and supplies the parallax offset to the parallax image generation processor 14. The parameter related to the positions of the cameras 11a and 11b represents a distance (range) to the object measured by the range-finding system 10. The parallax image generation processor 14 executes general range-finding stereo camera processing. Herein, by using the offset generated by the parallax offset detection processor 15, deterioration in the ranging accuracy of the hardware structure over time can be alleviated The detail process in the processing units in the parallax offset detection processor 15 is described below. Initially, process operation in the parallax image generation processor 14 is described below with reference to a flowchart shown in FIG. 3. At step S300, the stereo image acquisition unit 30 receives the stereo images captured by the two cameras 11a and 11b arranged in parallel simultaneously for output to the feature point abstract unit 31.

At step S301, the feature point abstract unit 31 abstracts the feature points FPr1 and FPr2 in the stereo image. More specifically, the feature point abstract unit 31 abstracts the multiple feature points FPr1 and FPr2 whose shading is enormously changed in the reference images R1 and R2 captured by the first camera 11a.

Then, at step S302, the corresponding point search unit 32 searches for the corresponding points. More specifically, the corresponding point search unit 32 searches the position of the corresponding points CP1 and CP2, where the object detected as the feature points FPr1 and FPr2 in the reference images R1 and R2 is identical to the object shown in the comparison images C1 and C2, in a feature vicinity area (block) in the comparison images C1 and C2 captured by the second camera 11b. For the search of the corresponding points CP1 and CP2, various types of known method, such as Sum of Absolute Difference (SAD) and phase only correlation (POC) can be applied.

At step S303, the parallax calculator 33 calculates the parallax (parallax data). More specifically, the parallax calculator 33 acquires the difference of the positions between the feature points FPr1(FPr2) in the reference image R1(R2) and the corresponding points CP1(CP2) in the comparison image C1(C2) to calculate the parallax. Furthermore, the parallax calculator 33 subtracts the parallax offset, input from the parallax offset detection processor 15, from the parallax to correct the parallax offset. The parallax offset is set at 0 pending the result of the parallax offset detection process.

At step S304, the parallax image output unit 34 outputs the parallax images Pr1 and Pr2 having the parallax whose parallax offset is corrected as pixel values. By repeating above-described process, the parallax images Pr1 and Pr2 corresponding to the area in front of the cameras can be always kept outputting.

The parallax offset detection processor 15 calculates the parallax offset from the input image. Depending on temperature change, the parallax offset detection processor 15 always calculates the parallax offset periodically and repeatedly in use of the stereo camera.

Figure 4:
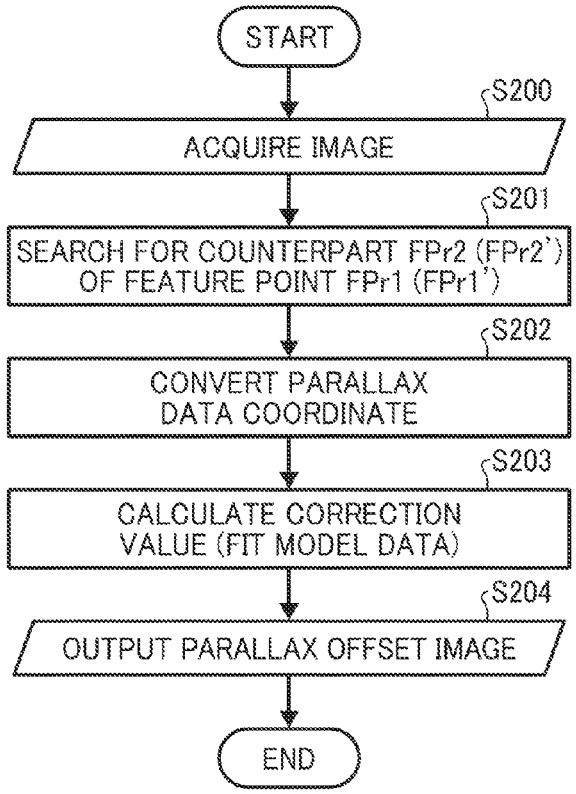
FIG. 4 is a flow chart illustrating 1 cycle of a process executed by a parallax offset detection processor in the image processor shown in FIG. 2.

FIG. 4 is a flowchart illustrating 1 cycle of parallax offset detection process in the parallax offset detection processor 15. At step S200, the images R1, R2, Pr1, and Pr2 are input to the image acquisition unit 20. More specifically, the reference images R1 and R2 at a first point P1 and a second point P2 from the camera controller 13 are input to the image acquisition unit 20. In addition, the two parallax images Pr1 and Pr2 correlated to the reference images R1 and R2 from the parallax image generation processor 14 are input to the image acquisition unit 20.

At step S201, the feature point search unit 21 searches for corresponding feature points (counterparts) FPr2' and FPr2', correlated to the feature points FPr1 and between the two reference images R1 and R2 by correlating the feature point FPr1(FPr1') detected in the reference image R1 to the point where the object detected as the feature point FPr1(FPr1') in the reference image R1 is identical to the object shown in the reference image R2. That is, the feature point search unit 21 searches for the counterpart FPr2(FPr2') of the feature point FPr1(FPr1') of the reference image R1, in the reference image R2; in the other word, the feature point search unit 21 searches for common feature points (FPr1'–FPr1', FPr2'–FPr2) in the two reference images R1 and R2. The feature point search unit 21 calculates SAD per blocks and searches for the position with minimum value, similarly to the corresponding search in the parallax image generation processor 25. However, differing from the search of the corresponding points (CP1–FPr1, CP2–FPr2) in the stereo image, the feature point search unit 21 sets radial searching area. By setting the radial search area, the amount of calculation is decreased, and the moving object in a horizontal direction and the rotation of the vehicle can be eliminated in a certain degree.

At step S202, the coordinate converter 22 converts a coordinate of the parallax data coordinate. More specifically, the coordinate converter 22 calculates the average of the inverse of the parallax per the reference-feature points FPr2–FPr1 and FPr2'–FPr1', and a difference Q of the parallax depending on the two items of parallax data (p0, p1).

$$P = \frac{1}{2} \times \left( \frac{1}{p_0} + \frac{1}{p_1} \right) \quad (1)$$

$$Q = \frac{1}{p_0} + \frac{1}{p_1} \quad (2)$$

Next, as the correction value calculation process, a calculation process to approximate linearly the multiple items of parallax data converted by the coordinate conversion process, and to calculate the correction value based on the position of the approximate straight line is described below. A straight line "Q=aP+B" is abstracted by executing "Haugh transform" to model fit "P-Q" data (see FIGS. 8 and 9).

More specifically, two-dimensional flat surfaces constituted by parameters (a, b) to be determined are divided into multiple regions, and the two-dimensional arrangement corresponding to the respective regions are prepared in the memory. The formula "Q=aP+B" is regarded as the straight line in the (a, b) space, two-dimensional arrangement indicating (a, b) space, and the correction value calculator 23 votes for the measured values p0, p00 on the straight line "b=–aP+Q" of the two-dimensional arrangement indicating the (a, b) space. As the result of vote about all the data (P, Q), it is conceivable that (a, b) pair corresponding to the region having highest number of volte passes through the many measured values (P, Q), and (a, b) pair is selected as the model straight line.

As described above, by converting the coordinate system so that the travel distance of the camera itself can be easily separated from the influence of the parallax offset, the calibration system 15 can be used wide applicability and calibrate the correction value with a high degree of accuracy. The correction value is calculated based on the simple straight line approximation, which can realize the stable calibration system at a low cost.

Figure 9:
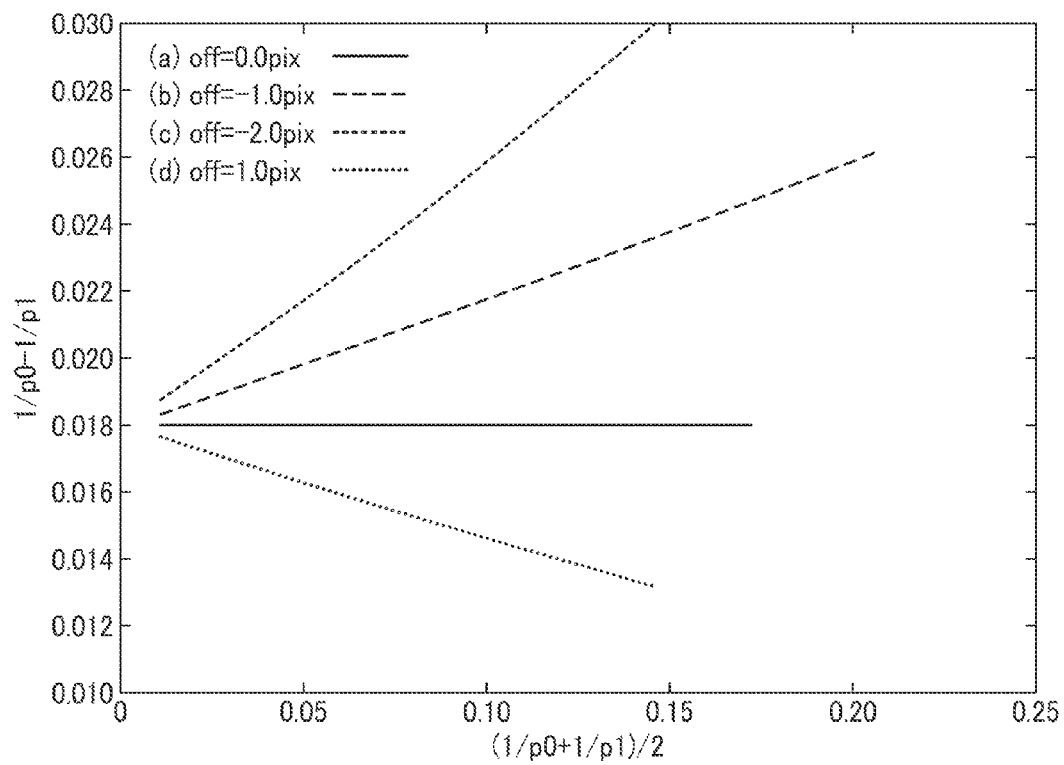
FIG. 9 is a diagram of a parallax offset plotted in the graph shown in FIG. 8.

With reference to FIGS. 8 and 9, the position and the gradient of the straight line are changed depending on the amount of the parallax offset and the camera travel distance, which is described in further detail later. Therefore, the estimation value of the parallax offset can be determined based on the acquired parameters (a, b). As illustrated in FIGS. 8 and 9, various types of simulations are performed with various types of camera travel distances and the amounts of the parallax offset, and the approximately converted formula for the amount of parallax offset from the values (a, b) can be set in advance.

Herein, an estimation value $p_{off}$ of the parallax offset is calculated depending on the following formula 3.

$$p_{off} = \frac{a}{2b} \quad (3)$$

It is to be noted that, the estimation value $p_{off}$ of the parallax offset is the result of which the curve is approximated to the straight line, which cannot avoid the estimation error at model stages.

However, by repeating the detection process of the parallax offset and the correction process thereof, if the error is decreased as the parallax offset becomes closer to 0, after repeating these processes many time, the parallax offset can be expected to calm down near 0 value.

The correction value calculator 23(23*a*) sends the parallax offset obtained as the result of the output model fit of the parallax offset $p_{off}$ to the parallax calculator 33 of the parallax image generation processor 14. It is to be noted that, stabilization, accumulation, and evaluation of the reliability are effective, and executing them is preferable.

In addition, in the coordinate conversion process described above, the average of the inverse of the two parallaxes in the horizontal axis is calculated in this embodiment. Alternatively, if any inverse of parallax ($1/p_0$ or $1/p_1$) is used, these calculations have a similar tend. Yet alternatively, the difference of the inverse is not directly calculated but calculated as the formula 4, which reduces the number of division.

$$\frac{1}{p_0} - \frac{1}{p_1} = \frac{p_1 - p_0}{p_0 p_1} \quad (4)$$

As described above, the parallax offset is estimated using only the data calculated from the stereo image captured at the predetermined points (locations) P1 and P2. Therefore, the parallax offset does not depend on the characteristics of the sensor (e.g., vehicle speed sensor except the camera) that measures the vehicle position. In addition, not by the presence of the specific shaped object (e.g., traffic light and road surface), but by using the various images captured in operation, the calibration device 15 can stably detect the parallax offset.

<Fundamental Rule>

Next, a fundamental rule of correcting the parallax offset is described below.

Figure 5:
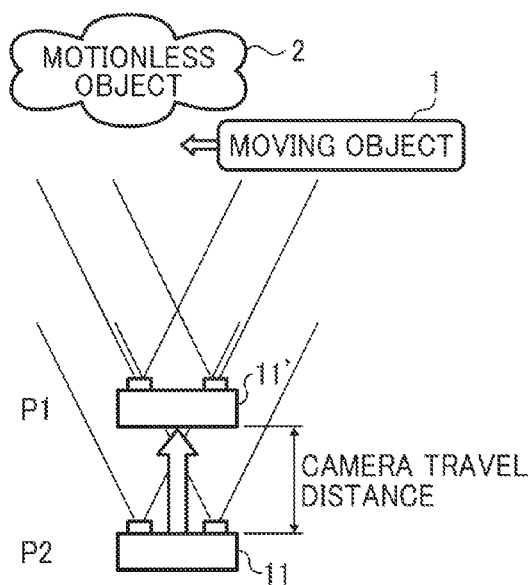
FIG. 5 is a schematic view illustrating arrangement of a stereo camera shown in FIG. 1 to capture stereo images from two viewpoints.
Figure 6:
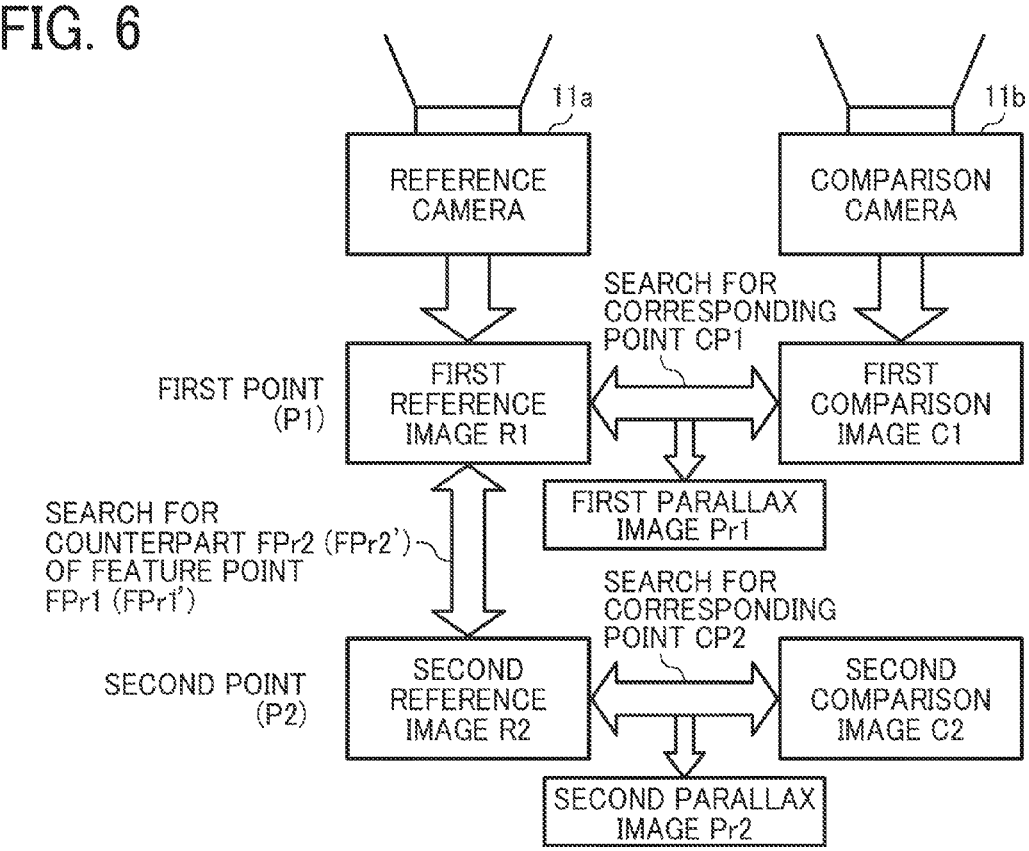
FIG. 6 is a schematic view illustrating images to form a stereo image, using the stereo camera shown in FIG. 5.

(1) Initially, in FIGS. 5 and 6, the stereo cameras 11*a* and 11*b* that go straight ahead capture the two reference images R1 and R2 and the comparison images C1 and C2 as circumference scenery containing the motionless object and the moving objects.

(2) About the first point (location) P1 and the second point P2, the corresponding points CP1–FPr1 and CP2–FPr2) between the reference image R1 (R2) and the comparison image C1(C2) are searched; more specifically, the corresponding points CP1(CP2) where the object detected as the feature points FPr1(FPr2) in the reference images R1(R2) is identical to the object shown in the comparison images C1(C2). Then, the parallax image Pr1 and Pr2 at the respective locations P1 and P2 are calculated. Herein, the parallax images Pr1 and Pr2 are the image whose parallax is set at a pixel value.

(3) The corresponding feature points (counterpart feature points) (FPr2–FPr1; and FPr2'–FPr2) between the reference images R1 and R2 positioned at the first point (location) P1 and the second point P2 are searched by correlating the feature point FPr1(FPr1') detected in the reference image R1 to the points (counterpart) FPr2(PPr2') where the object detected as the feature point FPr1(FPr1') in the reference image R1 is identical to the object shown in the reference image R2.

With these processes, the pairs of the two parallax data that capture two points for each feature point FPr1(FPr1') and the counterpart feature points FPr2(FPr2') at which the same object is captured to the feature point FPr1(FPr1') are multiply collected. TABLE 1 illustrates the parallax 1 ($p_0$) and parallax 2 ($p_1$) corresponding to the feature points FPr1 and FPr2.

TABLE 1

| NUMBER OF FEATURE POINTS FPr1, FPr2, ... FPrN | PARALLAX 1 ($p_0$) | PARALLAX 2 ($p_1$) |
|---|---|---|
| 0 | a | b |
| 1 | c | d |
| . | . | . |
| . | . | . |
| . | . | . |
| N | x | y |

In a comparative example of a calibration technique shown in FIG. 7, as a precondition in which the stereo-camera rangefinding system is mounted in the moving body (e.g., vehicle), by moving the stereo camera, it is seen that multiple objects stopped on the ground is relatively moved. In this calibration technique, a way of modeling of the measure data is calibrated, using two axes composed by a parallax and a parallax difference to cancel influence of the parallax offset by acquiring the difference between two parallaxes obtained by stereoscopic capturing the same object from two different viewpoints.

For example, assuming that a base length is 10 cm, a lens focal distance is 5 mm and a senor pixel pitch is 3 um, the parallax data and parallax difference of the motionless object is plotted in FIG. 7. In graph of FIG. 7, a horizontal axis indicates representative parallax $\sqrt{p_0 \times p_1}$, a vertical axis indicates difference of the parallax ($p_1-p_0$), and lines and dots mean as following situations.

(a) No parallax offset; Travel distance between two points: 3 m (b) Parallax offset: 1 pixel; Travel distance between two points: 3 in (c) Parallax offset: 0 pixel; Travel distance between two points: 3.3 m (d) Virtual measuring data obtained by adding random numbers whose amplitude is 0.3 pixels to the ideal parallax data of (b).

With reference to FIG. 7, the curve of no parallax offset is deviated from the curve of 1 pixel parallax offset. The virtual measuring data (d) having offset is surely distributed around the curve (b). If a quadratic curve is fit to the data (d), extremely near result of the curve (b) can be acquired.

However, simultaneously, the curve (c) whose travel distance is 3.3 in instead of the zero offset is very near to the curve (b) and the interval between the curve (b) and the curve (c) is smaller than the parallax calculation error of 0.3 pixel degrees. That is, if there is slightly deviation caused by noise on the actual measuring data, the curve (b) are easily mistaken from the curve (c), and the estimation error of the parallax offset corresponding to 0.3 pixels may occur.

Accordingly, depending on various situations, such as, the existence of the travel distance sensor in the vehicle and search error of the corresponding points (feature points) in the stereo image (parallax detection error), the accuracy of the parallax offset has limited. Therefore, a parallax offset correction method to improve the accuracy of parallax offset detection is desired.

FIG. 8 is a graph in which the parameter same to FIG. 7 is plotted to these axes according to the present embodiment. FIG. 9 is a graph in which the travel distance is set at 3 m, and the parallax offsets are set at −1, 0, 1, 2 pixels. The inverse of the parallax is proportional to the distance, as a precondition to the phenomenon that the motionless object is moved in the same distance, the difference $(1/p_0 - 1/p_1)$ of the inverses of the parallaxes is set constant when the parallax offset is 0 pixel.

Although the strict solution when the parallax offset is present is complicated, as illustrated in FIG. 9, the solution is substantially straight in a range within from pixel, it can be assumed that the gradient of the straight line is changed depending on the amount of the parallax offset. In addition, considering the parallax detection error, since the inverse of the parallax is calculated, the noise is relatively increased in the area where the parallax is small and the inverse of the parallax is large.

However, in the area where the parallax is large (for example, a range within 0.05 pixels around the horizontal axis in FIG. 7), the travel distance of 3.3 m and the parallax per 1 pixel can be easily discriminated, differing from FIG. 7.

To summaries this point, in the space defined by two axes of the sum of the inverse of the parallaxes and the difference of the inverse of the parallaxes, following data results are obtained.

(1) The data corresponds to the motionless object is distributed substantially linearly.

(2) The travel distance corresponds to the height of the straight line (Y intercept). More specifically, the entire graph is expanded and contrasted in a vertical direction depending on the travel distance.

(3) The parallax offset corresponds to the gradient of the straight line.

In this method, the fitting model is the straight line, and an unknown travel distance and the parallax is divided into the height and the gradient. Accordingly, estimation of the parallax offset by fitting model to this space becomes easier, and estimation with a high degree of accuracy can be expected.

Therefore, in the below-described second embodiment, the horizontal axis in the parallax-parallax ratio parameter space indicates the parallax itself $(p_0)$, and the vertical axis therein indicates the parallax ratio $(p_0/p_1)$.

Second Embodiment

Next, as a second embodiment, an operation of a parallax offset detection process using a parallax-parallax ratio space is described below. In this embodiment, the configuration is similar to the first embodiment thereof; and therefore, only the difference in the parallax offset detection process of a parallax-data coordinate conversion process and model fit process, from that in the first embodiment, is described below.

In addition, parallax ratio p is calculated for each of the feature points FPr1 and FPr1' and the counter feature points FPr2 and FPr2' searched in the parallax-data coordinate conversion process in a coordinate converter 23*b*, based on corresponding two items of parallax data $(1/p_0, 1/p_1)$.

$$p = p_0/p_1 \quad (5)$$

Next, the calculation process to calculate ratio of two parallaxes as the coordinate conversion process is described below. Similarly to the model fit process described above in the first embodiment, by executing "Hough transform" to the parallax-parallax ratio data, the straight line "$p_0 = ap + b$" is abstracted.

Figure 10:
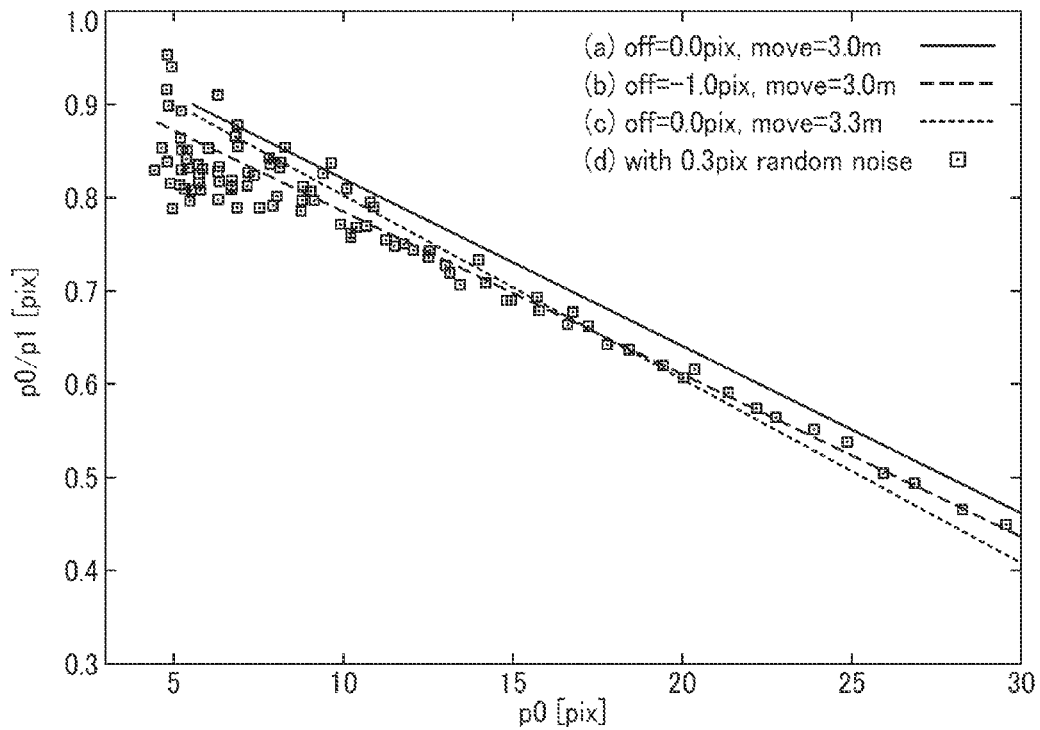
FIG. 10 is a diagram in which a parameter is plotted to a graph whose horizontal axis is a parallax and vertical axis is a ratio of the parallaxes according to a second embodiment.
Figure 11:
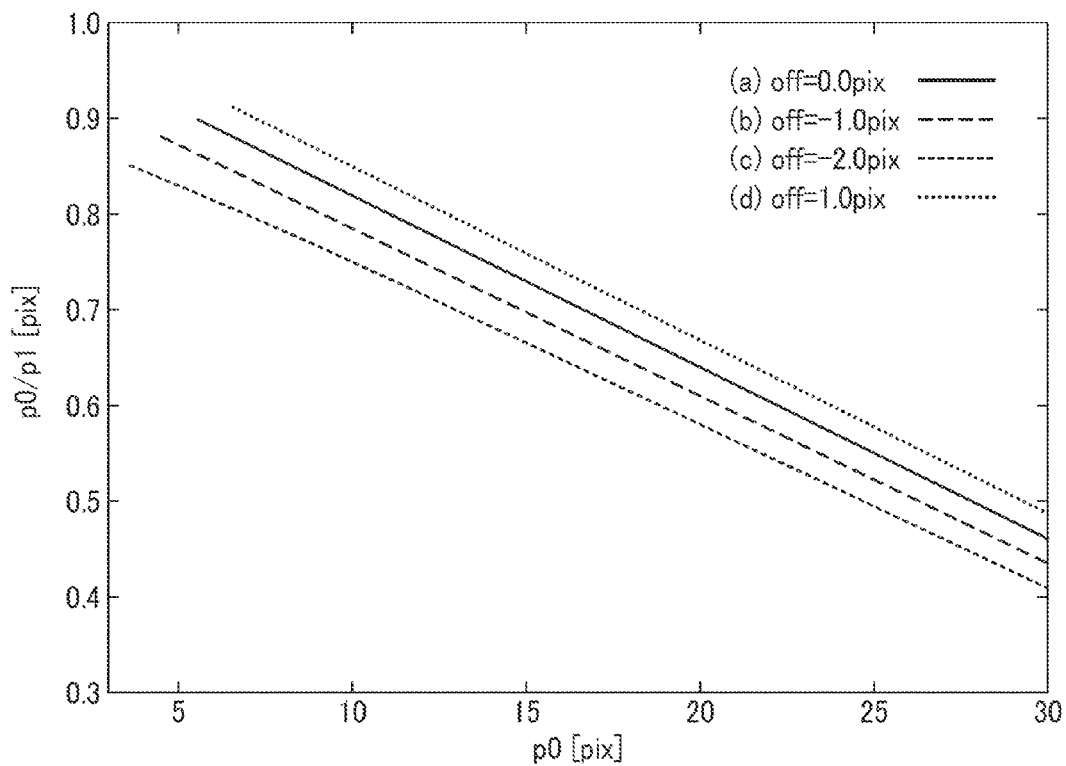
FIG. 11 is a diagram of a parallax offset plotted in the graph shown in FIG. 10.

Therefore, an estimation value $p_{off}$ of the parallax offset can be determined based on the acquired parameters (a, b). As illustrated in FIGS. 10 and 11, various types of simulations are performed with various types of camera travel distances and the amounts of the parallax offset, and the approximately converted formula for the amount of parallax offset from the values (a, b) can be set in advance.

Herein, the estimation value $p_{off}$ of the parallax offset is calculated depending on the following formula 6.

$$p_{off} = \frac{1-b}{2a} \quad (6)$$

As described above, for the parallax ratio of the two parallax data at the reference-feature points FPr2−FPr1 and FPr2'−FPr1' in the two reference images R1 and R2, by executing "Haugh transform" to the parallax-parallax ratio data, the straight line "$p_0 = ap + b$" is abstracted, and the position deviation of the stereo camera over time can be corrected with a high degree of accuracy. More specifically, not depending on the vehicle information measuring sensor such as vehicle, speed sensor, other than the camera, and not assuming the presence of the specific shaped object, the parallax offset can be stably detected, using the various images in use.

FIG. 10 illustrates a graph in which the parameter of FIG. 9 is plotted to the above-described space, similarly to FIG. 8. FIG. 11 illustrates a graph in which the travel distance is set at 3 m, similarly to the situation (a) described above, and −1, 0, 1, 2 pixels are scaled. This space of FIG. 11 differs from that of FIG. 9 and has the following characteristics.

(1) The motionless objects are arranged substantially linearly. However, the gradient of arrange of the motionless object is not horizontal when the parallax offset is zero.

(2) The gradient of the straight line changes depending on the travel distance.

(3) The straight line is shifted in substantially parallel depending on the parallax offset.

(4) When the parallax is small, the influence in the parallax detection error is large. As the parallax becomes greater, the variability becomes smaller.

Accordingly, in this space, the camera travel distance and the parallax offset are divided approximately into the parallel shift and the gradient. Thus, the travel distance of 3.3 m and the parallax offset can be easily separated.

As described above, the two parallaxes are evaluated after the two parallaxes are converted into an appropriate coordinate system, the unknown camera travel distance and the parallax offset can be stably estimated.

<Effect>

Herein, in the present disclosure of FIGS. 8 through 11 and the comparative example of FIG. 7, many objects remain stationary against the ground, and the motionless object is moved isometric in a same direction to the camera caused by moving the camera itself. Using this phenomenon, using limited condition that the two parallaxes ($p_0$, $p_1$) is obtained when the motionless object is measured, the parallax offset of the stereo camera is calculated.

In the comparative example using the difference ($p_1-p_0$) between the two parallaxes shown in FIG. 7, the limited condition in which the motionless object is disposed on the quadratic curve, which has a problem for model fitting.

Conversely, in the calculation of the present disclosure shown in FIGS. 8 through 11 using the space whose axes coordinates are constituted by the ratio of the two items of parallax data ($p_1/p_0$) or difference of inverse ($1/p_1-1/p_0$), more stable model fitting can be performed, thereby achieving more reliable correction of the parallax. As described above, in the first embodiment shown in FIGS. 8 and 9, the horizontal axis represents average of inverse of the two parallax parameters $$\left(\frac{\frac{1}{p_0}-\frac{1}{p_1}}{2}\right),$$

and in the second embodiment shown in FIGS. 10 and 11, the vertical axis represents the difference ($1/p_1-1/p_0$) of the inverse of the parallaxes.

Herein, by converting the pair of parallax data (p0, p1) acquired by stereo image at two points into the appropriate coordinate system, other than the parallax difference ($p_1-p_0$), reliability of the subsequent parallax offset estimation (approximated to the straight line) can be improved.

In addition, the issue that the offset value is easily to confused to the different points in the quadratic curve at which the offset value is 0 and at different distance points, when the quadratic curve is estimated from the point plotted for acquiring the offset value, can be solved by separating the distance difference and the offset difference into the intercept and the gradient. Thus, the parallax can be easily estimated.

<Vehicle>

Figure 12:
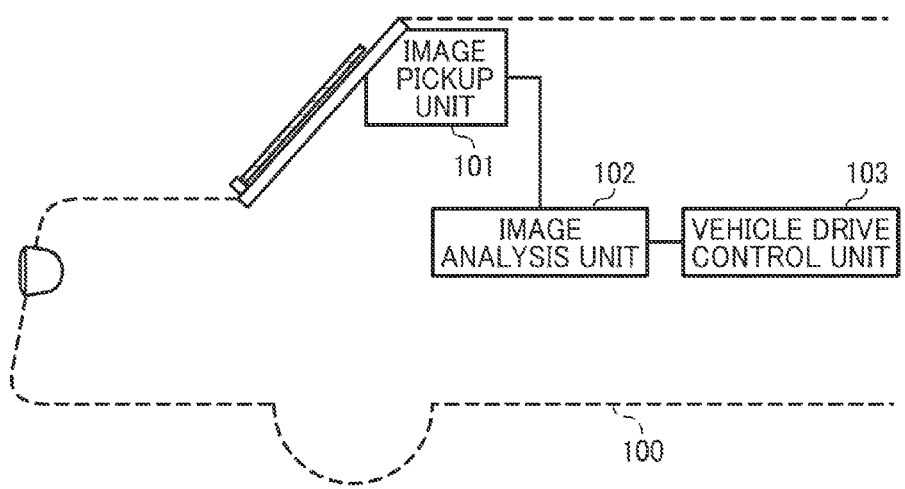
FIG. 12 is a schematic diagram illustrating a vehicle mounting the present range-finding system shown in FIG. 1.

FIG. 12 is a schematic diagram illustrating a vehicle 100 mounting the present range-finding system 10. An image processing system in the vehicle 100 includes an image pickup unit 101 to acquire the image forward of the vehicle 100 and an image analysis unit 102 that calculates the distance from another vehicle driving in front of the vehicle 100 based on the image acquired in the image pickup unit 101. The image pickup unit 101 is positioned near a rearview mirror in the vehicle 100 so that the image pickup unit 101 can capture the forward image containing another vehicle driving in front of the vehicle 100 and calculate a distance to another vehicle from the vehicle 100. The image of the vehicle in front acquired by the image pickup unit 101 is input to and converted into the image signal for output to the image analysis unit 102. The image analysis unit 102 analyses the output image signal from the image pickup unit 101. As for the image pickup unit 101, the stereo camera device 1 of the present embodiment composed of the reference camera 11a and the comparison camera 11b can be used. As a part of function of the image analysis unit 102, the image processor 12 can be applied.

A vehicle drive control unit 108 can control steering and brake of the vehicle 100 based on the distance from the vehicle in the front calculated by the image analysis unit 102.

Numerous additional modifications and variations are possible in light of the above teachings. It is therefore to be understood that, within the scope of the appended claims, the disclosure of this patent specification may be practiced otherwise than as specifically described herein.

What is claimed is:

1. A calibration device for calibrating ranges obtained by a range-finding system connected to a reference imaging device, a comparison imaging device, and a parallax calculator, the reference imaging device being configured to capture at least two reference images at two locations, the comparison imaging device being configured to capture at least two comparison images at the two locations, the calibration device comprising:
   an image acquisition unit configured to receive the at least two reference images and multiple items of parallax data from the parallax calculator, the items of parallax data being calculated based on multiple feature points in the at least two reference images and multiple corresponding points in the at least two comparison images correlated to the feature points in the at least two reference images;
   a feature point search unit configured to, for each of the reference-feature points between the at least two reference images, search for multiple reference-feature points common to the at least two reference images;
   a coordinate converter configured to convert coordinates of the items of parallax data to generate converted parallax data based on the multiple feature points and the multiple corresponding points, wherein the coordinate converter includes one of a difference calculator and a ratio calculator, the difference calculator being configured to calculate a difference between inverses of pairs of the items of parallax data and generate the converted parallax data based on the calculated difference, the ratio calculator being configured to calculate a ratio between pairs of the items of parallax data and generate the converted parallax data based on the calculated ratio; and
   a correction value calculator configured to calculate a correction value to correct the range measured by the range finding system, based on the converted parallax data from the coordinate converter.

2. The calibration device according to claim 1, wherein the correction value calculator is configured to approximate the converted parallax data to a straight line, and calculate the correction value based on a position of the straight line.

3. A range-finding system that measures distance, comprising:
   a reference imaging device configured to capture at least two reference images at two locations;
   a comparison imaging device configured to capture at least two comparison images at the two locations;
   a parallax calculator configured to calculate multiple items of parallax data; and
   a calibration device configured to calibrate a range measured by the range-finding system,
   the calibration device comprising:
      an image acquisition unit configured to receive the at least two reference images and the multiple items of parallax data, the items of parallax data being calculated based on multiple feature points in the at least two reference images and multiple corresponding points in the at least two comparison images correlated to the feature points in the at least two reference images;
a feature point search unit configured to search for multiple reference-feature points common to the at least two reference images;
a coordinate converter configured to, for each of the reference-feature points between the at least two reference images, convert coordinates of the items of parallax data to generate converted parallax data based on the multiple feature points and the multiple corresponding points, wherein the coordinate converter includes one of a difference calculator and a ratio calculator, the difference calculator being configured to calculate a difference between inverses of pairs of the items of parallax data and generate the converted parallax data based on the calculated difference, the ratio calculator being configured to calculate a ratio between pairs of the items of parallax data and generate the converted parallax data based on the calculated ratio; and
a correction value calculator configured to calculate a correction value to correct the range measured by the range finding system, based on converted parallax data from the coordinate converter.

4. A vehicle mounting the range-finding system of claim 3.

* * * * *